US012554892B2

(12) United States Patent
Michaels et al.

(10) Patent No.: US 12,554,892 B2
(45) Date of Patent: Feb. 17, 2026

(54) STORAGE AGNOSTIC DATA PATH INTERCEPTION FOR TRANSPARENT SNAPSHOT DATA PROTECTION IN CONTAINERIZED ENVIRONMENTS

(71) Applicant: Dell Products L.P., Round Rock, TX (US)

(72) Inventors: Nomi Michaels, Beit Shemesh (IL); Jehuda Shemer, Kfar Saba (IL); Ofir Ezrielev, Be'er Sheva (IL); Bar Kliger, Ramat Hakovesh (IL); Yehuda Rimon, Be'er Sheva (IL); Yehonatan Israeli, Kfar Saba (IL)

(73) Assignee: Dell Products L.P., Round Rock, TX (US)

(\*) Notice: Subject to any disclaimer, the term of this patent is extended or adjusted under 35 U.S.C. 154(b) by 172 days.

(21) Appl. No.: 18/594,119

(22) Filed: Mar. 4, 2024

(65) Prior Publication Data
US 2025/0278520 A1 Sep. 4, 2025

(51) Int. Cl.
*G06F 21/64* (2013.01)
*G06F 21/56* (2013.01)
*G06F 21/55* (2013.01)

(52) U.S. Cl.
CPC ............ *G06F 21/64* (2013.01); *G06F 21/56* (2013.01); *G06F 21/55* (2013.01); *G06F 21/566* (2013.01); *G06F 2221/034* (2013.01)

(58) Field of Classification Search
None
See application file for complete search history.

(56) References Cited

U.S. PATENT DOCUMENTS

| 2004/0221065 | A1* | 11/2004 | Banerjee | H04L 67/1095 709/250 |
| 2017/0214550 | A1* | 7/2017 | Kumar | H04L 41/5045 |
| 2017/0220641 | A1* | 8/2017 | Chi | G06F 8/38 |
| 2021/0141621 | A1* | 5/2021 | Scolnick | G06F 8/38 |
| 2021/0216953 | A1* | 7/2021 | Ramos | G06Q 10/0833 |
| 2022/0158926 | A1* | 5/2022 | Wennerström | H04L 43/20 |

(Continued)

FOREIGN PATENT DOCUMENTS

| CN | 112231061 A | * | 1/2021 | ......... G06F 9/45558 |
| CN | 113312242 A | * | 8/2021 | ............ G06F 11/302 |

(Continued)

OTHER PUBLICATIONS

Nam Xuan Nguyen; (Network isolation for Kubernetes hard multi-tenancy); Aalto University; pp. 90; Jul. 31, 2020.*

(Continued)

*Primary Examiner* — Ali H. Cheema
(74) *Attorney, Agent, or Firm* — Workman Nydegger (57) ABSTRACT

An agnostic data path interception in containerized environments is disclosed. A protection container configured to perform an operation such as a data protection operation is packaged as a device interface. A configuration of a main container that is the subject of the operation is changed to point to the device interface of the protection container. This allows the protection container to be positioned in a path between the main container and assigned storage and allows the operation to be performed on input/outputs associated with running the main container.

15 Claims, 5 Drawing Sheets

(56) References Cited

U.S. PATENT DOCUMENTS

| | | | |
|---|---|---|---|
| 2023/0105744 A1* | 4/2023 | Lin | H04L 12/4641 |
| | | | 370/392 |
| 2023/0121475 A1* | 4/2023 | Kowalczyk | G06F 9/5027 |
| | | | 718/104 |
| 2023/0388393 A1* | 11/2023 | Foukas | G06F 9/45558 |
| 2024/0256329 A1* | 8/2024 | Wali | G06F 9/4881 |
| 2024/0291759 A1* | 8/2024 | Jain | H04L 45/74 |
| 2024/0386091 A1* | 11/2024 | Knierim | G06F 21/53 |

FOREIGN PATENT DOCUMENTS

| | | | | | |
|---|---|---|---|---|---|
| CN | 114489953 A | * | 5/2022 | | G06F 9/45558 |
| CN | 114816662 A | * | 7/2022 | | G06F 9/45558 |
| CN | 115292002 A | * | 11/2022 | | |
| CN | 118170491 A | * | 6/2024 | | G06F 11/079 |

OTHER PUBLICATIONS

Aarni Halinen; (Security Risks for Sidecar Containers in Kubernetes); Aalto University; pp. 75; Dec. 29, 2023.*

* cited by examiner

STORAGE AGNOSTIC DATA PATH INTERCEPTION FOR TRANSPARENT SNAPSHOT DATA PROTECTION IN CONTAINERIZED ENVIRONMENTS

FIELD OF THE INVENTION

Embodiments of the present invention generally relate to data protection systems and methods. More particularly, at least some embodiments of the invention relate to systems, hardware, software, computer-readable media, and methods for data protection operations in containerized computing environments.

BACKGROUND

A container is a type of virtualization. A container typically includes all of the components of an application needed to run on an infrastructure. The container may include operating system libraries, configuration files, and dependencies. One of the advantages of a container is that the container is abstracted with respect to the host and the host's operating system. As a result, containers are portable and can generally run in any computing environment.

Containers are often managed or orchestrated using a container orchestration system, such as Kubernetes, which is an open source platform for managing containerized applications.

Because there are different types of containers (e.g., different container platforms) and different orchestration platforms, the process of performing data protection operations (e.g., backing up a container and/or its data) can be problematic. This problem is further complicated by the fact that providers may use different storage systems from different storage providers. These providers may be bare-metal, local, or cloud providers. Performing data protection operations in these scenarios may require the highest permission levels and may require storage providers to be changed or overridden. These requirements may not be practical or possible and complicate many types of operations including data protection operations.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to various type of systems/applications including data protection systems/applications and data protection operations. More particularly, at least some embodiments of the invention relate to systems, hardware, software, computer-readable media, and methods for performing data protection operations in computer environments such as containerized environments.

Embodiments of the invention are discussed with respect to containerized environments or orchestration platforms, and example of which is Kubernetes. Containerized environments often provide (or provide access to) storage devices (e.g., volumes). Containerized environments may use different storage providers.

Embodiments of the invention relate to an agnostic data protection system that is configured to perform data protection operations in containerized environments. More specifically, the data protection system may perform data protection operations with respect to a containerized application or with respect to an entire pod that my include multiple containers. The data protection system, advantageously, is platform agnostic and not limited to a particular container orchestration system such as Kubernetes or a container platform such as Docker.

Embodiments of the invention are discussed in the context of data protection operations, but may also be applied to other operations such as ransomware detection, traffic analysis, traffic monitoring, data filtering, IO (Input/Output) tracking, IO statistics, data splitting, continuous data protection, mirroring, or the like. Further, embodiments of the invention may perform multiple operations using a single container, multiple containers, and/or chained containers.

Embodiments of the invention intercept data traffic (e.g., IOs or data being written to storage) by exposing a device that is operating as another container, referred to as a protection container. The main container (the container or application being protected) is modified to point to the device or to the protection container. Thus, the main container may view the protection container as its assigned volume or storage. Aspects of the data protection system are implemented in the protection container.

More specifically, the creation parameters of the main container are modified such that the volume or storage to be used by the main container is the device presented by the protection container. As a result, data is intercepted or filtered at the application level and the protection container may be run in any deployment type including managed cloud deployments. Generally, pod-level privileges may be required during initialization. The protection container can perform data protection operations (e.g., generate snapshots, continuous data protection, mirroring, data analysis) and forward the data to the actual volume or storage associated with the main container.

The protection container may also be configured to perform other operations. For example, some IOs may be blocked or filtered as a security measure. Other IOs may be modified prior to forwarding. For example, IOs (or data) may be encrypted, compressed obfuscated, or the like.

Embodiments of the invention thus relate to implementing a filter (or protection container) that exposes or is viewed as a device from the perspective of other containers. The protection container is configured to perform data protection operations in one example.

Figure 1:
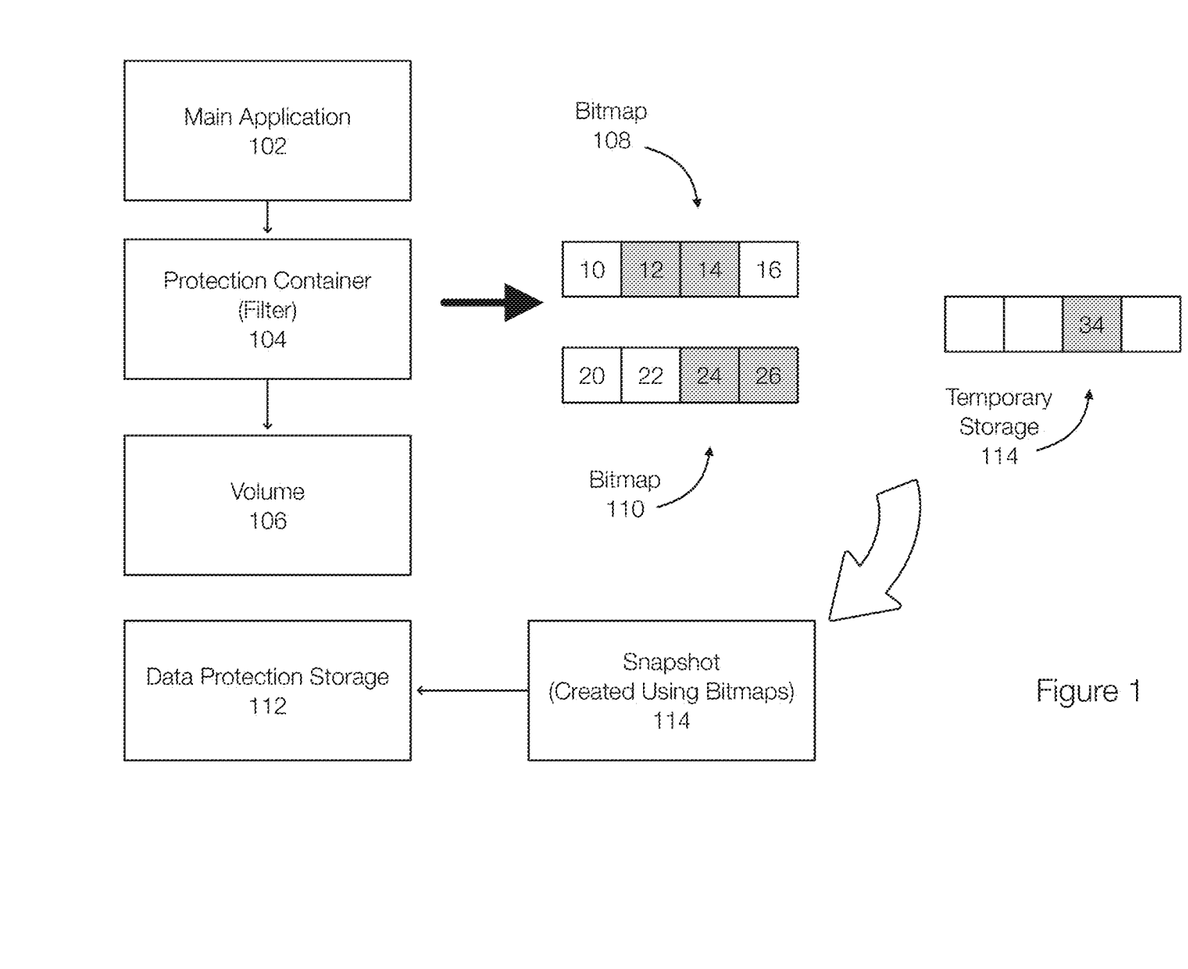
FIG. 1 discloses aspects of a data protection operation performed in a containerized environment.

FIG. 1 discloses aspects of a data protection system/operation performed in a containerized environment. FIG. 1 illustrates a main application 102, which is an example of a containerized application, and a protection container 104. In this example, data, commands (e.g., read/write) or the like to the volume 106 are intercepted by the protection container 104. When performing data protection, the data or write is transmitted to both the data protection storage 112 and the volume 106. The volume 106 is used by the main application 102 and the data protection storage 112 is for data protection purposes in one example.

FIG. 1 more specifically illustrates an example of a data protection operation. The data protection operation of FIG. 1 performs change block tracking. In change block tracking, a bitmap is used to track which portions of a volume or storage have changed. For instance, each bit in the bitmap may represent a fixed sized extent (e.g., 64 Kilobytes (KBs)). The index of the bit correlates to a location on the volume. Thus, bit 0 is the first 64 KB, bit 1 is the second 64 KB, and so on.

The granularity of the bitmap can be changed or vary from one implementation to the next. A bitmap with higher granularity corresponds to smaller extents and more accurate tracking. However, a higher granularity also corresponds to a larger bitmap, which requires more memory and resources to track changes to the extents. Generally, the size of the extents is fixed and the same. However, embodiments of the invention may allow for variable resolutions, variable sized extents, and/or variable bitmap sizes. Generally, the granularity is between 8 KB and 128 KB.

In one example, multiple bitmaps may be used. A first bitmap is initially cleared (e.g., all bits set to zero). When an IO to a volume location is received, the bits that correspond to the location of the write are set to one (dirty bits). Any overlap between the IO and the extent will set the bit to 1. Thus, a write that is 32 KB results in a bit being set for the whole extent. A write that overlaps two different extents results in a bit being set for each of the two extents.

When a snapshot (or other backup) is generated, a new (second) bitmap is generated and the first bitmap is persisted. If a new IO is received and the location of the IO is dirty (based on the first bitmap), undo data is read from the volume and stored in a temporary storage for that location. The second bitmap is also marked as dirty for the relevant location. The IO is then permitted to proceed.

Using the first bitmap, data in the extents corresponding to the dirty bits are written to the data protection storage. If a bit is marked only in the first bitmap, the data from the volume is sent. If a bit is marked in both the first bitmap (previous bitmap) and second bitmap (new bitmap), then corresponding data from the temporary storage is read and transmitted to the data protection storage. When a second snapshot is performed, the new bitmap is persisted and becomes the previous bitmap, and the previous bitmap is cleared and becomes the new bitmap. Alternatively, a new bitmap may be created and the first or previous bitmap is deleted.

FIG. 1 provides a simple example of change block tracking. The bitmap 108 is an example of a current bitmap and assumes that a full backup was previously performed. The bitmap 108 becomes a previous bitmap when a snapshot or backup operation is performed. When the snapshot or backup operation is performed or initiated, the bitmap 110 becomes the new bitmap and is set to all zeros in one example.

In this simple example, the volume 106 is represented by 4 bits in the bitmap 108 (bits 10, 12, 14, and 16,). Thus, if the volume 106 represents 1 Gigabyte, each bit in the bitmap 108 represents 256 KB of data or a 256 KB extent.

FIG. 1 more specifically illustrates a point in time after a snapshot request has been received and initiated. Thus, the bits 20, 22, 24, and 26 in the new bitmap 110 represent the same extents as, respectively, bits 10, 12, 14, and 16.

In this example, the previous bitmap 108 illustrates that bits 12 and 14 are dirty. The new bitmap 110 illustrates that IOs for bits 24 and 26 have been received. When the IO to the location corresponding to the bit 24 is received, undo data from the location in the volume is stored in the temporary storage 114 because the bit 14 in the previous bitmap 108 is dirty.

This process allows writes to continue while the bitmap 108 is processed. In this example, the snapshot includes data from the extent corresponding to the bit 12 and undo data 34 from the temporary storage 114. Once the bitmap 108 is processed and the snapshot or backup is completed, the bitmap 108 may be cleared and used as the next new bitmap for the next snapshot or backup operation.

While a particular change block tracking method is presented, embodiments of the invention can be implemented independently of the snapshot or backup method used by the protection container 104. In this example, a snapshot 114, created by the protection container 104, is generated using the bitmaps 108, 110, and/or the temporary storage 114 and stored in the data protection storage 112, which may be remote relative to the volume 106. The data protection storage 112 may be configured to be identical to the volume 106 in one example.

The bitmaps 108 and 110 and the temporary storage 114 are an example of a tracking mechanism or an example of change block tracking. Embodiments of the invention contemplate other tracking mechanisms such as metadata lists, bit/are trees, or the like.

Figure 2A:
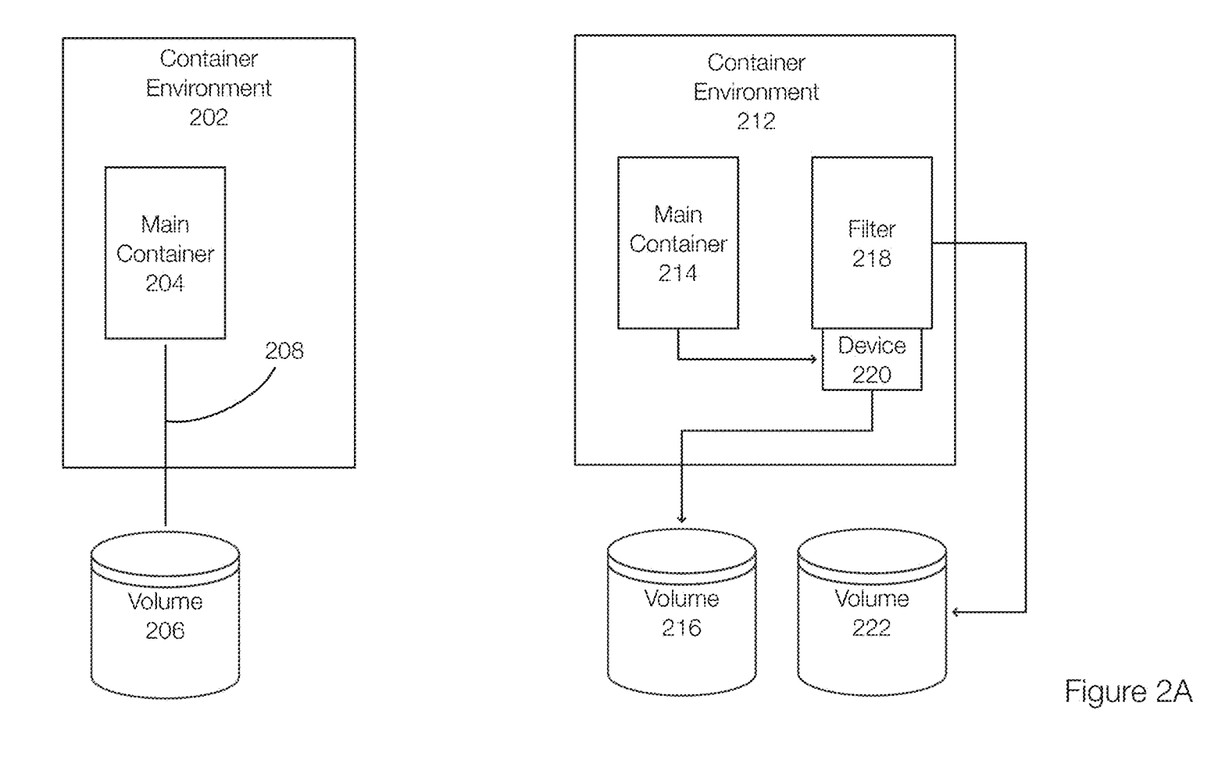
FIG. 2A discloses aspects of performing data protection operations in containerized environments and illustrates containerized data protection systems.

FIG. 2A discloses aspects of performing data protection operations in containerized environments and illustrates containerized data protection systems. FIG. 2A illustrates a container environment before (container environment 202) and after (container environment 212) being configured for data protection operations.

In this example, the container environment 202 includes a pod with a single main container 204 that is associated with a volume 206. The container environment 202 may include processors, memory, and other hardware and may include services or other devices. The volume 206 may be a storage device or system exposed to the container environment 202 or pod.

When a container is created to run a main application, the container is created/run using the standard command line of the container platform. Generally, references to any volumes to be used by the container are passed or provided to the container in the command line. In one example, there is a mapping between the reference of the volume on the host (volume host or device) and the path to access this device within the container.

For example, the following command may be issued:
\# docker run-volume/path/to/host_path:/path/to/container_path image command (1).

In command (1), the –volume (–v for short) command attaches the main container to a volume exposed on the host. The "/path/to/host_path" is a reference to the volume on the host machine (the server node that is running the platform). The "/path/to/container_path" is how this volume is identified in the container.

A specific example of this syntax may be:
docker run –v demo-volume:/data ubuntu (2).

In the example command (2), the host "demo-volume" will be mounted in the container as "/data".

With reference to FIG. 2A, the volume 206 corresponds to the volume "demo-volume" and the path mounted in the container 204 is "/data".

In one example, volumes can be exposed as either block devices or filesystem devices. While the interface to a block device may differ from the interface to a filesystem device, a device is a structure that exposes, by way of example only, the following operations: open, close, read, and write.

In other words, once the volume 206 is mounted in the main container 204, the main container interfaces with the volume 206 via a device interface. The main container 204 does not know the origin of the volume 206 or its mapping. The main container 204 opens the device, reads or writes to devices, and closes once the device when these operations are completed.

Any entity that exposes this type of a device interface can therefore be passed as a volume to the container 204. Embodiments of the invention create a device and the device, which may be embodied as a protection container, is passed as a volume to the main container. An example configuration is illustrated in the container environment 212.

More specifically, embodiments of the invention insert a data protection system into the path 208 as illustrated in the container environment 212. The container environment 212 is the same as the container environment 202. The main container 214 is the same as the main container 204 and the volume 216 is the same as the volume 206. The container environment 212, however, illustrates a platform agnostic data protection system in a container environment 212 that has been inserted into the path 208.

Implementing the filter 218, which is an example of a protection container, may be implemented by creating a filter device 220 and routing the main container 214 to the device 220. In one example, the device 220 (or device interface) is packaged as a container or filter 218. The filter 218 may be a sidecar container or a stand-alone container. In one example, the filter 218 may be configured to simply forward reads and/or writes to another device. The filter 218 could also specify a target device.

More generally, to route the main container 214 to the filter 218 or to the device 220, the filter 218 may be run as a sidecar container or as a container. When the filter 218 is run as a sidecar container, all volumes assigned to the pod may be passed to the filter 218. This allows an implementation where the filter 218 can simply forward the reads and writes received by the filter to the volume 216, which was assigned to the pod.

To insert the filter in the path 208, embodiments of the invention may change the pod initialization sequence. Thus, the filter 218 may be run as an init-container, which is a type of container that is typically run before other containers in a pod. In the initialization sequence, the command line for the main container 214 is changed to point to the device 220 as follows: docker run –v orig-volume:/mnt ubuntu→docker run –v filter_dev:/mnt ubuntu (3).

In this example, because the internal mount name in the container "/mnt" is the same, the application running in the main container 214 does not know that reads and writes have been re-routed. This operation may require pod elevated privileges depending on platform.

FIG. 2A illustrates that after the filter 218 has been installed, the filter 218 can be configured to perform various data protection operations. More specifically, the filter 218 is a container operating in the application space and may, as a consequence, connect to any other application services or platform infrastructure. Example operations performed by the filter 218 may include, by way of example only, IO tracking operations, IO statistic operations, traffic analysis operations, malware or ransomware detection operations, data protection operations, data filtering/modification operations, data splitting operations (e.g., continuous data protection), mirroring operations, and/or the like.

The example of FIG. 2A relates to one volume, a single command, and a single protection container. However, a single protection container may be configured to handle multiple volumes. Thus, the command may represent multiple commands or be adapted for multiple volumes.

Figure 2B:
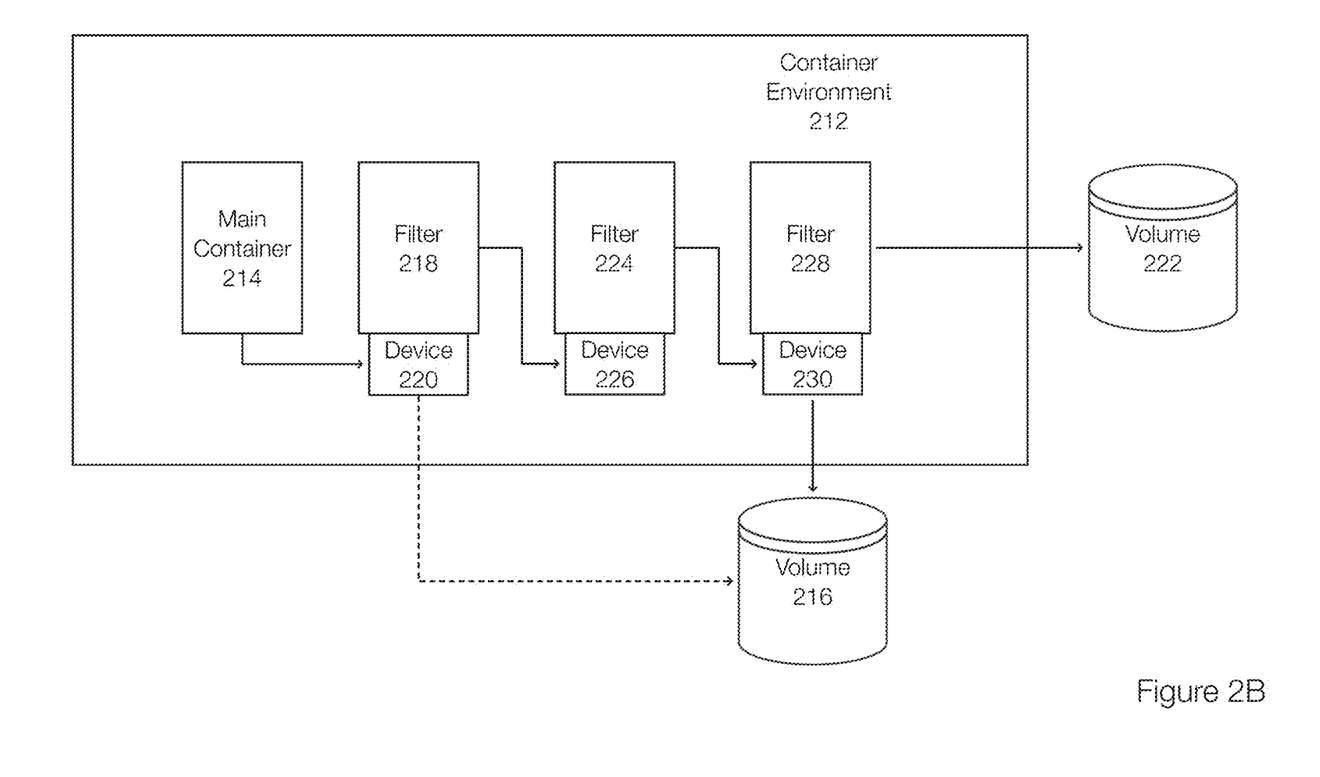
FIG. 2B discloses aspects of chained protection containers.

FIG. 2B discloses additional aspects of protection containers in a containerized environment including chained containers. More specifically, embodiments of the invention contemplate multiple protection containers that may be arranged in a chained configuration. In FIG. 2B, multiple protection containers may be chained such that the last protection container in the chain points to the volume 222. In this example, the volume 216 is connected with the device 230. However, depending on the operations of the filters 218, 224, and 228, the volume 216 could be connected to the device 220 as illustrated by the dashed line. Each of the chained protection containers may perform a different function or may be configured to implement a particular function. In addition, a single protection container can be configured to perform multiple functions (e.g., encryption and compression).

In this example, the main container 214 points to the filter 218 (or exposed device 220). The filter 218 points to the device 226. The filter 224 points to the device 230. The filter 228 is configured to perform the IO with respect to the volume 222 and the volume 216. In this example, the main container 214 is unaware of the protection containers placed in the path 208.

The protection containers (filters 218, 224, 228) may perform related or independent operations. For example, the filter 218 may generate a snapshot. The filter 224 may compress the snapshot, and the filter 228 may encrypt the compressed snapshot. In another example, the filter 218 may perform a security operation that is performed prior to the data protection operations of the filters 224 and 228. Thus, a particular IO may be stopped or handled differently at the filter 218.

There are multiple possible configurations. For example, multiple protection containers may be run such that each of these containers manages a subset of volumes assigned to the main container. Alternatively, the same protection container may perform multiple operations.

As illustrated in FIGS. 1, 2A and 2B, the filter 218 (and/or other filters) may include a data protection application configured to perform data protection operations such as snapshot or backup operations using change block tracking. In one example, snapshots or backups are performed using a tracking mechanism such as change block tracking. In one example of a tracking mechanism, the filter 218 may include bitmaps to track locations of write IOs, a temporary storage, and the like.

When the filter 218 is initially created, the bitmap may be marked as all dirty. This allows a full copy of the data to be sent to the target volume 222. Subsequently, differentials are transmitted to the volume 222 by the filter 218 as previously described.

Latency added by the filter 218 is typically minimal. The filter 218 is in the same host and memory space in one example. As a result, any delay or latency is related to copying or moving the data over the device 220 (the filter interface). The latency may be on the order of microseconds.

Pods and containers are also ephemeral and may be destroyed at any time. The bitmaps included in the filter 218 may be more resilient and be stored in persistent storage, NVRAM, or host shared memory. This strengthens the data protection operations being performed and may allow a snapshot operation to be completed even if the main application has been terminated or failed.

In one embodiment, the operations performed by the filter 218 may vary and some operations may be performed in other containers. For example, transfer operations may be performed by another container, which may be common between other pods, and function as a backup driver container. As previously stated, the filter 218 is agnostic to the storage technology and can be configured to operate in various cloud platforms, on-premise platforms, and the like.

Figure 3:
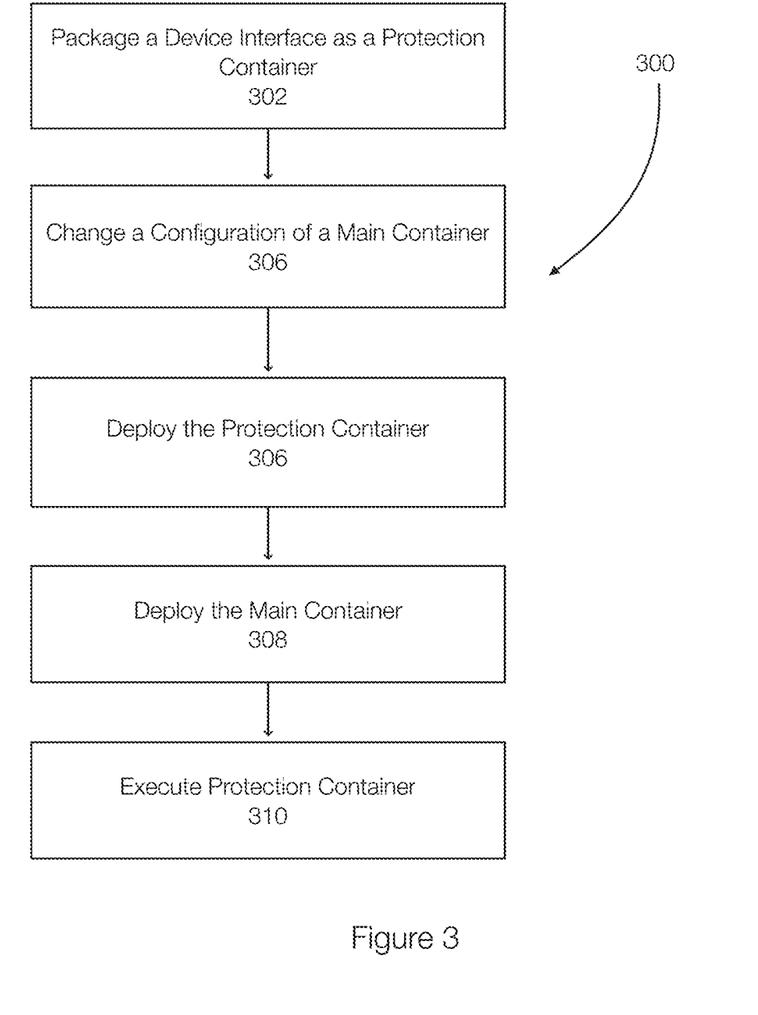
FIG. 3 discloses aspects of performing operations, such as data protection operations, in a containerized computing environment.

FIG. 3 discloses aspects of a method for performing operations, which may include data protection operations, in a containerized environment. The method 300 may include various phases including a configuration/deployment phase and an operational phase. These phases may be performed sequentially and may be performed separately and independently.

The steps or acts of the method 300 may be performed in various orders and the method 300 is presented by way of example. The method 300 includes packaging a device interface as a protection container 302. In one example, the filter 218 and the device 220 are an example of a protection container. This allows the protection container to be viewed, from the perspective of a main container, as a device such as a volume or other storage device.

Next, a configuration of a main container is changed 306. This may be achieved using an initialization container (e.g., init-container), which is an example of a container that typically runs before other containers in a pod start. This allows various tasks to be performed including changing the configuration of the main container or the volume path recognized by the main container. The configuration is changed such that the volume exposed by a host is known and such that the path used by the main container is to the device or to the protection container.

Once the initialization is performed, the protection container is deployed 306 and the main container is deployed 308. The deployment order, more generally, is configured to ensure that the protection container is in the IO path of the main container. This may end the configuration/deployment phase of the method 300. When multiple protection containers are used, the deployment order is configured such that all dependencies (e.g., volume assignments or path modifications) are present.

The operational phase may include executing the protection container 310. As IOs from the main container are received at the device interface of the protection container, the operations of the protection container are performed as necessary. One of the operations performed is to forward the IOs to the assigned volume. Some operations, such as data protection operations, may involve the use of other volumes associated with the protection container.

Embodiments of the invention are not limited to data protection operations. The protection container may be configured to perform other types of operations as previously discussed.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, operations which may include, but are not limited to, data protection operations, backup operations, snapshot operations, data replication operations, IO replication operations, data read/write/delete operations, data deduplication operations, data backup operations, data restore operations, data cloning operations, data archiving operations, and disaster recovery operations. Other operations may include IO tracking operations, IO statistic operations, traffic analysis operations, malware or ransomware detection operations, data filtering or modification operations, or the like. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general, however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VMs).

Particularly, devices in the operating environment may take the form of software, physical machines, containers, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines, containers, or virtual machines (VM), though no particular component implementation is required for any embodiment.

Example embodiments of the invention are applicable to any system capable of storing and handling various types of objects, in analog, digital, or other form.

As used herein, the term 'backup' is intended to be broad in scope. As such, example backups in connection with which embodiments of the invention may be employed include, but are not limited to, full backups, partial backups, clones, snapshots, and incremental or differential backups.

It is noted that any operation(s) of any of these methods, may be performed in response to, as a result of, and/or based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Following are some further example embodiments of the invention. These are presented only by way of example and are not intended to limit the scope of the invention in any way.

Embodiment 1. A method, comprising: running a protection container in a containerized environment, the protection container including a device interface, changing a configuration of a main container to point to the device interface such that IOs of the main container are directed to the device interface, receiving the IOs at the protection container from the main container, and performing an operation on at least some of the IOs by the protection container.

Embodiment 2. The method of embodiment 1, further comprising running the main container after the configuration is changed.

Embodiment 3. The method of embodiment 1 and/or 2, further comprising packaging the device interface as the protection container, wherein the protection container is a container or a sidecar container.

Embodiment 4. The method of embodiment 1, 2, and/or 3, wherein the operation comprises at least one of an IO tracking operation, an IO statistic operation, a malware detection operation, a ransomware detection operations, a data filtering or modification operation, a data splitting operation for continuous data protection, an encryption operation, a compression operation, an obfuscation operation, and/or a mirroring operation.

Embodiment 5. The method of embodiment 1, 2, 3, and/or 4, wherein the protection container is associated with a data protection storage used for the IOs processed by the operation.

Embodiment 6. The method of embodiment 1, 2, 3, 4, and/or 5, wherein the operation comprises a data protection operation, further comprising forwarding the IOs to a storage associated with the main container.

Embodiment 7. The method of embodiment 1, 2, 3, 4, 5, and/or 6, the data protection operation comprising performing change block tracking using a tracking mechanism.

Embodiment 8. The method of embodiment 1, 2, 3, 4, 5, 6, and/or 7, wherein the tracking mechanism includes tracking changes using bitmaps, metadata lists, or segment trees, further comprising performing a snapshot that includes transmitting data identified as changed in the tracking mechanism.

Embodiment 9. The method of embodiment 1, 2, 3, 4, 5, 6, 7, and/or 8, wherein the snapshot is generated without interrupting writes to the storage.

Embodiment 10. The method of embodiment 1, 2, 3, 4, 5, 6, 7, 8, and/or 9, further comprising a plurality of protection containers wherein: the plurality of protection containers are arranged in a chained configuration, each of the protection containers manages a subset of volumes associated with the main container, and/or each of the protection containers performs at least one operation on the IOs.

Embodiment 11. The method of embodiment 1, 2, 3, 4, 5, 6, 7, 8, 9, and/or 10, wherein the protection container is a sidecar container.

Embodiment 12. A system, comprising hardware and/or software, operable to perform any of the operations, methods, or processes, or any portion of any of these, disclosed herein.

Embodiment 13 A non-transitory storage medium having stored therein instructions that are executable by one or more hardware processors to perform operations comprising the operations of any one or more of embodiments 1-11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, agent, service, engine, or the like may refer to software objects or routines that execute on the computing system. These may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 4:
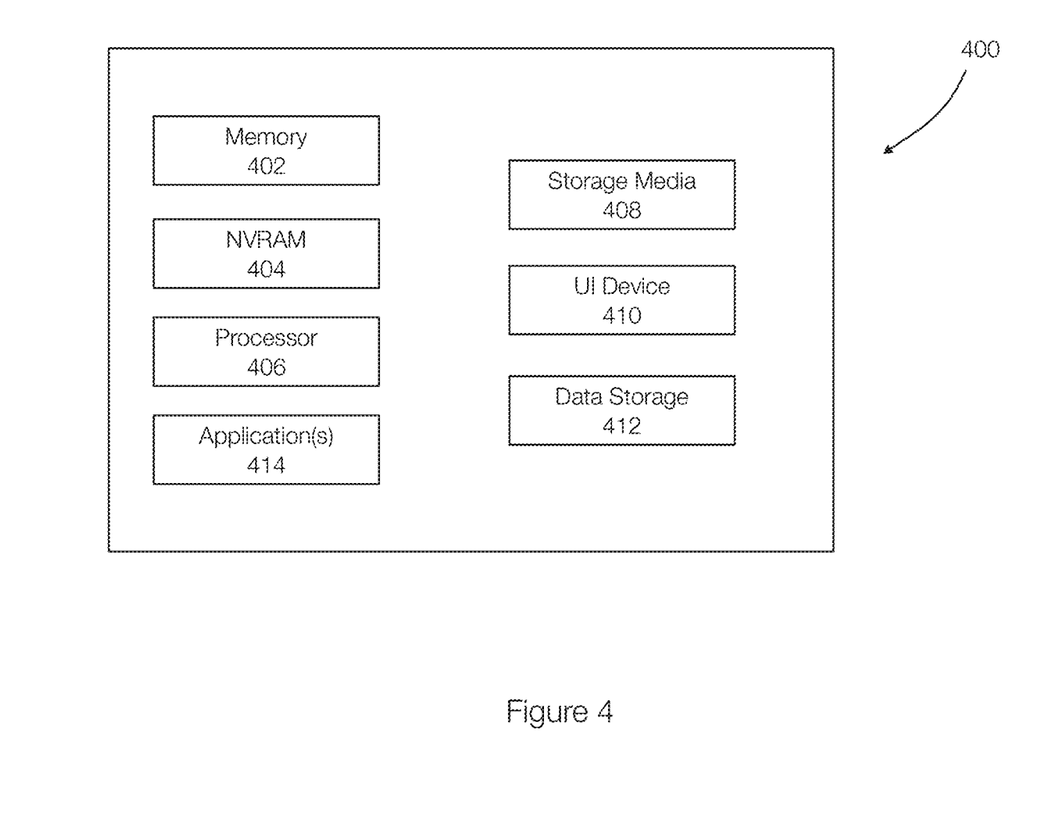
FIG. 4 discloses aspects of a computing device, system, or entity.

With reference briefly now to FIG. 4, any one or more of the entities disclosed, or implied, by the Figures and/or elsewhere herein, may take the form of, or include, or be implemented on, or hosted by, a physical computing device, one example of which is denoted at 400. As well, where any of the aforementioned elements comprise or consist of a virtual machine (VM), that VM may constitute a virtualization of any combination of the physical components disclosed in FIG. 4.

In the example of FIG. 4, the physical computing device 400 includes a memory 402 which may include one, some, or all, of random access memory (RAM), non-volatile memory (NVM) 404 such as NVRAM for example, read-only memory (ROM), and persistent memory, one or more hardware processors 406, non-transitory storage media 408, UI device 410, and data storage 412. One or more of the memory components 402 of the physical computing device 400 may take the form of solid state device (SSD) storage. As well, one or more applications 414 may be provided that comprise instructions executable by one or more hardware processors 406 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The device 400 may also be representative of a containerized environment with multiple hosts, servers, storage, and other infrastructure.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, being implemented by one or more hardware processors, comprising:
    running a protection container in a containerized environment, the protection container including a device interface;
    executing an initialization container to change configuration of a main container to point to the device interface included in the protection container, in order to direct input/outputs (IOs) of the main container to the device interface;
    running the main container after the configuration is changed;
    receiving the IOs at the protection container from the main container; and
    performing an operation on at least some of the IOs by the protection container, wherein the protection container is associated with a data protection storage used for the IOs processed by the operation.

2. The method of claim 1, further comprising:
    packaging the device interface as the protection container, wherein the protection container is a container or a sidecar container.

3. The method of claim 1, wherein the operation comprises at least one of an IO tracking operation, an IO statistic operation, a malware detection operation, a ransomware detection operation, a data filtering or modification operation, a data splitting operation for continuous data protection, an encryption operation, a compression operation, an obfuscation operation, and/or a mirroring operation.

4. The method of claim 1, wherein the operation comprises a data protection operation, further comprising:

forwarding the IOs to a storage associated with the main container.

5. The method of claim 4, wherein the data protection operation comprising:
performing change block tracking using a tracking mechanism, wherein the tracking mechanism includes tracking changes using bitmaps, metadata lists, or segment trees.

6. The method of claim 5, further comprising:
performing a snapshot that includes transmitting data identified as changed in the tracking mechanism.

7. The method of claim 6, wherein the snapshot is generated without interrupting writes to the storage.

8. The method of claim 1, further comprising a plurality of protection containers, wherein:
the plurality of protection containers are arranged in a chained configuration;
each of the protection containers manages a subset of volumes associated with the main container; and/or
each of the protection containers performs at least one operation on the IOs.

9. A non-transitory storage medium having stored therein instructions that are executable by one or more hardware processors to perform operations comprising:
running a protection container in a containerized environment, the protection container including a device interface;
executing an initialization container to change configuration of a main container to point to the device interface included in the protection container, in order to direct input/outputs (IOs) of the main container to the device interface;
running the main container after the configuration is changed;
receiving the IOs at the protection container from the main container; and
performing an operation on at least some of the IOs by the protection container, wherein the protection container is associated with a data protection storage used for the IOs processed by the operation.

10. The non-transitory storage medium of claim 9, wherein the device interface is packaged as the protection container, wherein the protection container is a container or a sidecar container.

11. The non-transitory storage medium of claim 9, wherein the operation comprises at least one of an IO tracking operation, an IO statistic operation, a malware detection operation, a ransomware detection operation, a data filtering or modification operation, a data splitting operation for continuous data protection, an encryption operation, a compression operation, an obfuscation operation, and/or a mirroring operation.

12. The non-transitory storage medium of claim 9, wherein the operation comprises a data protection operation, further comprising:
forwarding the IOs to a storage associated with the main container.

13. The non-transitory storage medium of claim 12, wherein the data protection operation comprising:
performing change block tracking using a tracking mechanism, wherein the tracking mechanism includes tracking changes using bitmaps, metadata lists, or segment trees.

14. The non-transitory storage medium of claim 13, further comprising:
performing a snapshot that includes transmitting data identified as changed in the tracking mechanism.

15. The non-transitory storage medium of claim 14, wherein the snapshot is generated without interrupting writes to the storage.

* * * * *